ns Patent [19]
Otsuki et al.

[11] 3,998,824
[45] Dec. 21, 1976

[54] METHOD OF EMBEDDING INSERTS IN A THERMOPLASTIC BODY

[75] Inventors: Hiroshi Otsuki; Hideharu Yamamoto, both of Yokohama, Japan

[73] Assignee: Sony Corporation, Tokyo, Japan

[22] Filed: June 24, 1975

[21] Appl. No.: 589,900

Related U.S. Application Data

[63] Continuation of Ser. No. 422,130, Dec. 6, 1973, abandoned.

[30] Foreign Application Priority Data

Dec. 11, 1972    Japan ............................ 47-124111

[52] U.S. Cl. ........................... 264/249; 156/303.1; 264/259; 264/271; 264/319
[51] Int. Cl.² ..................... B29D 3/00; B29F 5/00
[58] Field of Search ............... 264/249, 23, 25, 27, 264/71, 259, 271, 319; 156/303.1

[56] References Cited

UNITED STATES PATENTS

| | | | |
|---|---|---|---|
| 596,264 | 12/1897 | Force et al. | 264/271 |
| 2,679,913 | 6/1954 | Scott | 264/249 |
| 3,184,353 | 5/1965 | Balamuth et al. | 264/23 |
| 3,189,672 | 6/1965 | Lyman | 264/249 |
| 3,261,909 | 7/1966 | Rust et al. | 264/249 |
| 3,264,721 | 8/1966 | Fitzpatrick et al. | 29/200 J |
| 3,265,781 | 8/1966 | Petersen | 264/249 |
| 3,436,803 | 4/1969 | Sarnoff | 264/23 |
| 3,440,118 | 4/1969 | Obeda | 264/23 |
| 3,444,018 | 5/1969 | Hewitt | 264/249 |

*Primary Examiner*—Willard E. Hoag
*Attorney, Agent, or Firm*—Lewis H. Eslinger; Alvin Sinderbrand

[57] ABSTRACT

In order to secure a metal element, such as, a pin or shaft, to a synthetic resin body so as to project from one surface of the latter, the body is formed with a hole extending from that one surface to the opposite surface of the body and preferably having a cross-sectional area smaller than that of a mounting portion at an end of the metal element, the metal element is inserted into the hole from that opposite surface, and the metal element is pressed in the axial direction of the hole toward the surface from which the metal element is to project so as to urge the mounting portion into the hole while softening the region of the body contacted by the mounting portion until the latter is contained in the hole and the metal element projects to the desired extent from the body, whereupon the body is allowed to harden at the region of its contact with the mounting portion. Preferably, the synthetic resin of the body is thermoplastic and is softened at its region of contact with the mounting portion by heat conducted through the latter from a heat source urged against the mounting portion for simultaneously pressing the mounting portion into the hole.

9 Claims, 10 Drawing Figures

Fig. 5
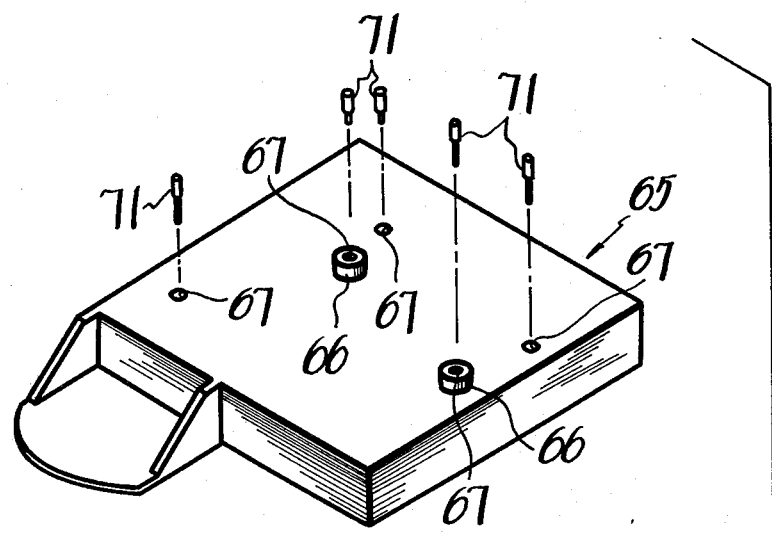
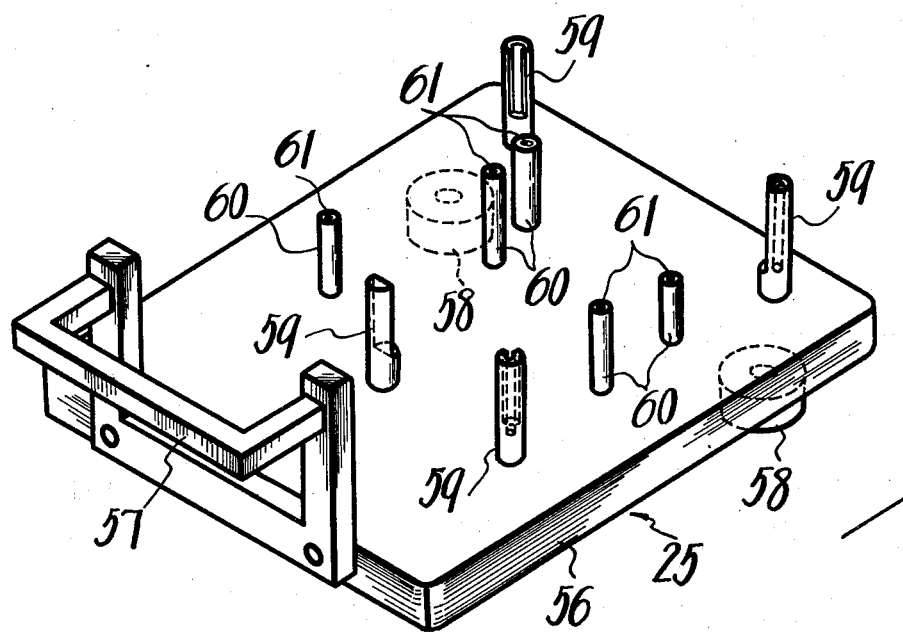

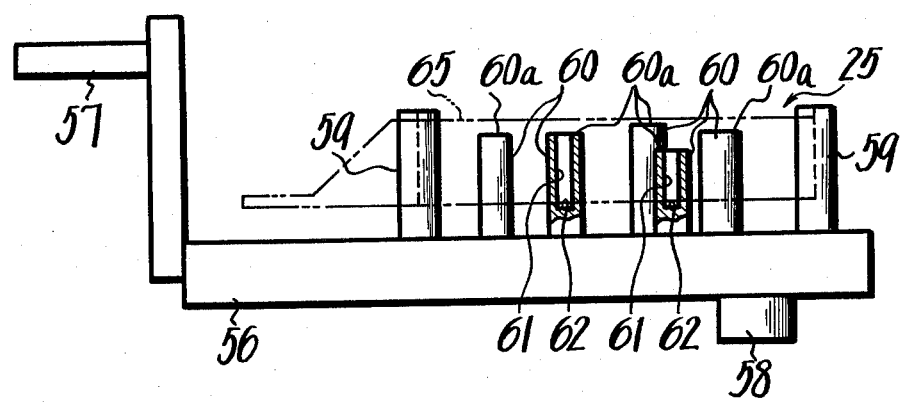
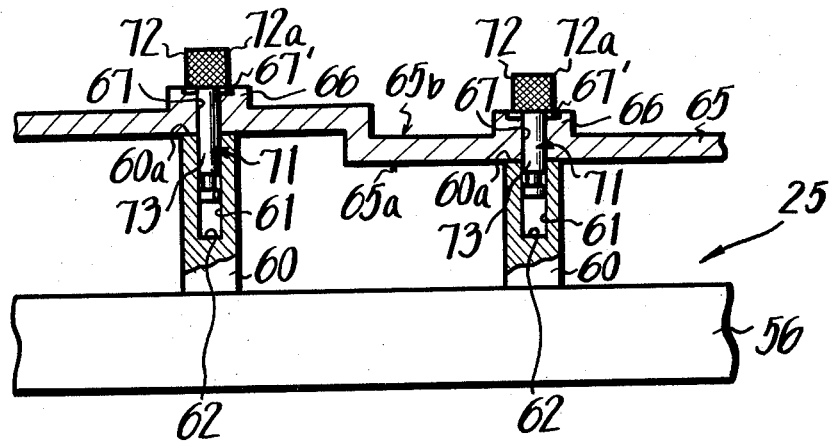
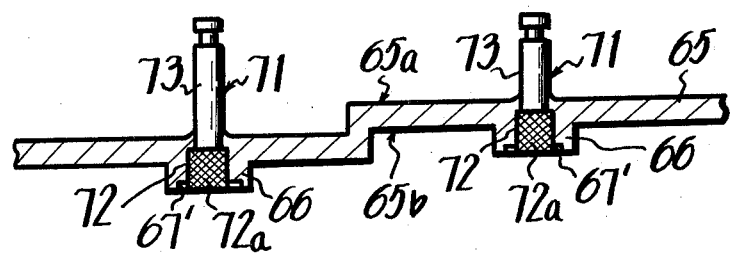

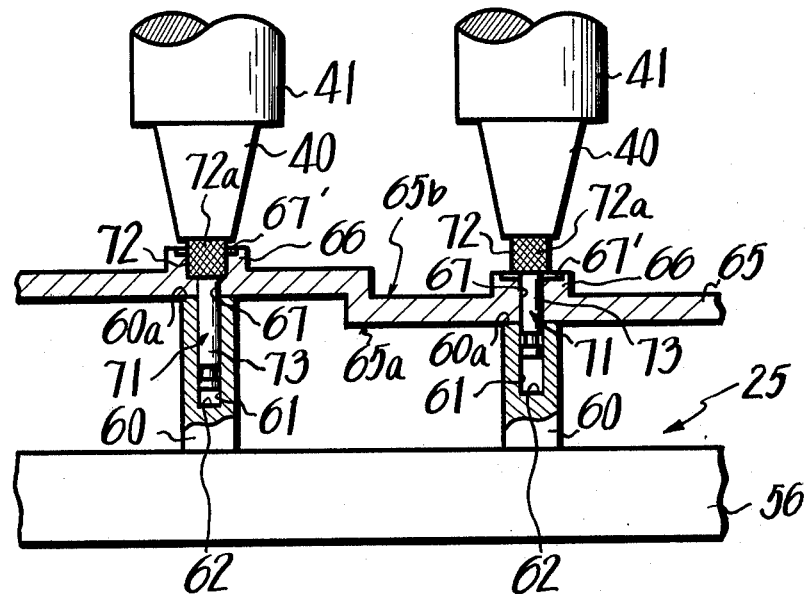
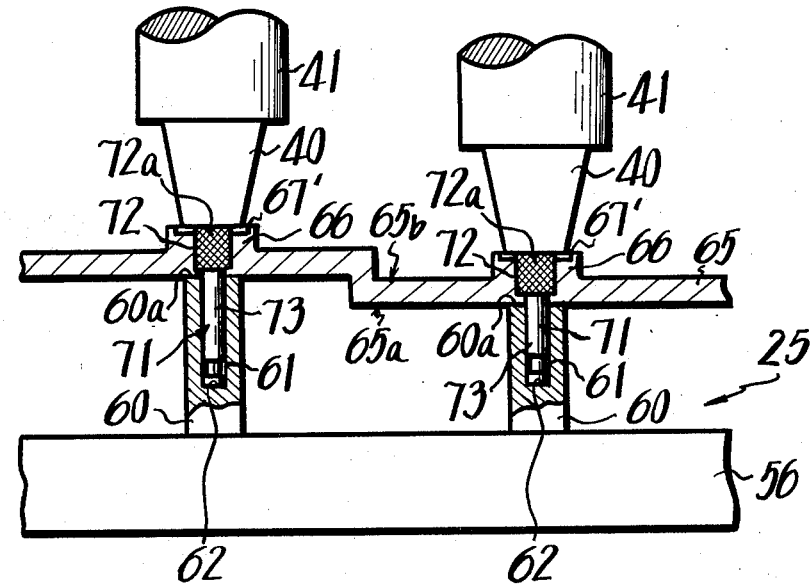

METHOD OF EMBEDDING INSERTS IN A THERMOPLASTIC BODY

This is a continuation of application Ser. No. 422,130 filed Dec. 6, 1973, and now abandoned.

BACKGROUND OF THE INVENTION

1. Field of the Invention

This invention relates generally to the attachment of metal elements to a synthetic resin substrate or body, and more particularly is directed to an improved method and apparatus for securely anchoring in the synthetic resin substrate or body metal elements, such as, guide pins, shafts and the like, which are to project from a surface of the body.

2. Description of the Prior Art

There are many occasions when it is necessary to provide a synthetic resin body or substrate, for example, a molded resin chassis or casing of a tape recorder or the like, with a plurality of metal elements, such as, guide pins, shafts and the like, which are to be anchored or embedded in the synthetic resin body and to project from a surface of the latter.

In an existing method for thus securing the metal elements to a synthetic resin body, each of the metal elements has a mounting portion at one end preferably formed with a knurled or roughened surface and with a cross-sectional area larger than that of a hole provided therefor in the body. A guide jig is placed against the surface of the body from which the metal elements are to project and is provided with guide bores aligned with the holes in the resin body and dimensioned to slidably receive the respective metal elements which are inserted with their mounting portions directed toward the resin body. When thus positioned by the jig, the metal elements are pressed axially in the direction into the respective holes and simultaneously have ultrasonic energy imparted thereto, for example, by respective tips extending from an ultrasonic horn and urged against the ends of the metal elements remote from their mounting portions. The ultrasonic energy thus transmitted to the metal elements is focused or localized at the areas of contact of the knurled surfaces of the mounting portions with the surfaces of the holes in the resin body so that the surfaces of the holes are fused to permit the mounting portions to enter such holes. Upon the full insertion of the mounting portions in the respective holes of the body, the application of ultrasonic energy is halted with the result that the previously fused synthetic resin sets or hardens about the knurled surfaces of the mounting portions for securely retaining the latter in the resin body with the respective mounting elements projecting therefrom within the guide bores of the jig.

The foregoing method is disadvantageous in that, in spite of the use of the guide jig, considerable time is required for implanting the metal elements in the synthetic resin body. Further, the ultrasonic energy transmitted through the metal elements to their mounting portions causes scarring or erosion of the guide bore surfaces due to contact of the latter with the metal elements with the result that the useful life of the guide jig is relatively short. It is also found that the metal elements, when implanted at their mounting portions in the synthetic resin body, are not in precise axial alignment with the respective guide bores of the jig with the result that removal of the jig from the metal elements is made difficult.

In order to avoid the foregoing disadvantages encountered in the use of ultrasonic energy for implanting the mounting portions of metal elements in the synthetic resin body, it has been proposed to dispense with the guide jig and to provide each of the metal elements with a guiding extension of reduced cross-section extending from the mounting portion so as to be initially received in the respective hole of the resin body for guiding the metal element during the movement of the mounting portion into such hole in response to the ultrasonic energy and axial pressure applied to the metal element as its free end, as in the first described method. However, such guiding extensions do not adequately guide the metal elements during the implanting of their mounting portions in the resin body with the result that the axes of the metal elements may deviate substantially from the desired normal relation to the surface of the body from which they project. Further, after the mounting portions of the metal elements are implanted in the resin body, the guiding extensions project from the holes at the underside of the body, that is, at the surface of the body opposed to that from which the metal elements project. Such projecting guiding elements are a nuisance in that they may interfere with the full utilization of the space under the resin body, particularly when the latter is the chassis or deck of a tape recorder or the like.

SUMMARY OF THE INVENTION

Accordingly, it is an object of this invention to provide an improved method and apparatus for securely anchoring or implanting elongated metal elements, such as, guide pins, shafts or the like, in a synthetic resin body, and which avoids the above described disadvantages of the methods previously proposed for that purpose.

Another object is to provide a method and apparatus, as aforesaid, with which the elongated metal elements, when anchored or implanted in the resin body, may be made to project precisely normal to a surface of the body.

A further object is to provide a method and apparatus, as aforesaid, with which the simultaneous anchoring or implanting of a plurality of the elongated metal elements can be easily effected.

A still further object is to provide a method and apparatus, as aforesaid, with which the elongated metal elements, when anchored or implanted in the resin body, project only from one surface of such body.

In accordance with an aspect of this invention, a through hole is provided in the synthetic, preferably thermoplastic resin body for each metal element and is dimensioned to permit the passage of the latter therethrough, and each element is formed with an enlarged mounting portion at one end having a larger cross-sectional area than the respective hole. Each metal element is inserted into the respective hole at the end of the latter remote from the surface of the body from which the metal element is to project so that the mounting portion is engageable with the opposite surface of the body. Then, the mounting portion of each metal element is pressed axially into the respective hole and, simultaneously, has heat applied thereto for conduction through the mounting portion to the region of contact of the mounting portion with the resin body, whereby the thermoplastic resin is softened in such region to permit the axial movement of the mounting portion into the respective hole and the projection of the metal element from the latter. When the metal element projects the desired extent from the resin body, the application of axial pressure and of heat to the mounting portion is halted, whereby the previously softened resin hardens or sets about the mounting portion for securing the latter in the resin body.

The above, and other objects, features and advantages of this invention, will be apparent in the following detailed description of an illustrative embodiment which is to be read in connection with the accompanying drawings.

BRIEF DESCRIPTION OF THE DRAWINGS

FIG. 5 is an exploded perspective view showing a synthetic resin body, metal elements to be embedded or anchored in such body, and a jig which may be used according to this invention for accurately locating the metal elements embedded in the resin body;

FIG. 6 is a side elevational view, partly in section, of the jig shown on FIG. 5; and FIGS. 7A, 7B, 7C and 7D are fragmentary sectional views similar to those of FIGS. 1 and 2, but illustrating successive steps in the embedding or anchoring of metal elements in a synthetic resin body in accordance with a method embodying this invention.

DESCRIPTION OF THE PREFERRED EMBODIMENT

Figure 1:
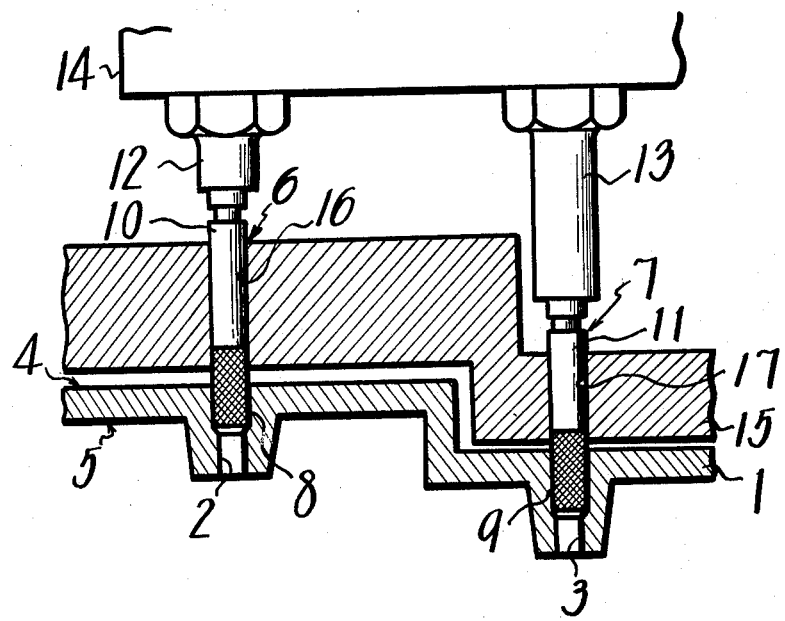
FIGS. 1 and 2 are fragmentary, sectional views illustrating respective methods of the prior art for embedding or implanting metal elements in a synthetic resin body with the assistance of ultrasonic energy.

Before describing a method and apparatus according to this invention, reference will be made to FIG. 1 of the drawings in which there is illustrated a prior art method for providing a synthetic resin body 1, for example, constituting a molded chassis for a tape recorder, with a plurality of elongated metal elements 6 and 7 having mounting portions 8 and 9, respectively, at one end which are to be embedded or anchored in originally undersized holes 2 and 3 formed through body 1 so as to open at the upper and lower surfaces 4 and 5 of such body. In order to embed or anchor mounting portions 8 and 9 of metal elements 6 and 7 in holes 2 and 3 with the remaining portions 10 and 11 projecting from surface 4 normal to the latter, for example, to function as shafts, guide pins or the like, the known method of FIG. 1 employs a guide jig 15 placed against surface 4 and having guide bores 16 and 17 aligned with holes 2 and 3 of body 1. The guide bores 16 and 17 are dimensioned to slidably receive metal elements 6 and 7 from above with the mounting portions 8 and 9, which preferably have khurled or roughened surfaces, being directed downwardly to engage body 1 at surface 4 of the latter. With the lower surface 5 of body 1 supported on a suitable work surface (not shown), tips 12 and 13 depending from an ultrasonic horn 14 are urged downwardly against the upper ends of elements 6 and 7, respectively, and transmit ultrasonic energy to elements 6 and 7 from a conventional ultrasonic vibration generator (not shown) connected with horn 14. Such ultrasonic energy is transmitted through metal elements 6 and 7 to the knurled surfaces of mounting portions 8 and 9 to cause fusing of the synthetic resin of body 1 at the regions of contact of the latter with such mounting portions. Thus, the mounting portions 8 and 9 are urged downwardly into holes 2 and 3 and, when fully contained in the latter, the application of downward pressure and ultrasonic energy to elements 6 and 7 is halted so that the fused regions of the synthetic resin set or harden about mounting portions 8 and 9 to adhere strongly to the knurled surfaces of the latter. However, with the method illustrated on FIG. 1, considerable time is required for the insertion of mounting portions 8 and 9 into undersized holes 2 and 3, and the ultrasonic energy transmitted through elements 6 and 7 causes scarring or erosion of the surfaces of the respective guide bores 16 and 17 in jig 15 with the result that the latter has a fairly short useful life. Further, when the mounting portions 8 and 9 of elements 6 and 7 are finally implanted in resin body 1, the projecting portions 10 and 11 of elements 6 and 7 may not be in axial alignment with guide bores 16 and 17, particularly when the latter become worn due to erosion by the ultrasonic energy, and in that case it is difficult to remove guide jig 15 from the projecting portions 10 and 11 of anchored elements 6 and 7.

Figure 2:
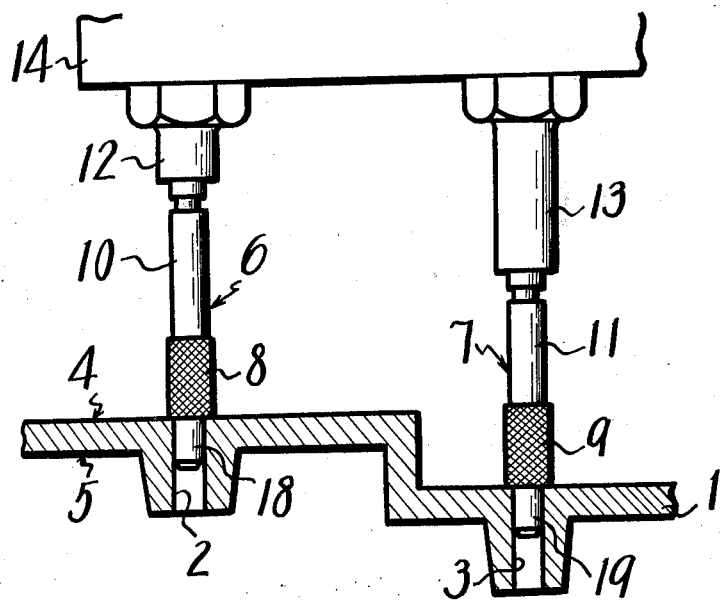

Referring now to FIG. 2, it will be seen that, in another known method employing ultrasonic energy, the guide jig 15 of FIG. 1 is omitted and the metal elements 6 and 7 are provided with guiding extensions 18 and 19 of reduced cross-section extending from mounting portions 8 and 9, respectively, in the axial direction opposed to the projecting portions 10 and 11 of the respective metal elements 6 and 7. The guiding extensions 18 and 19 are dimensioned to be closely received in holes 2 and 3 of the synthetic resin body 1 for guiding the respective elements 6 and 7 during the movement of their mounting portions 8 and 9 into holes 2 and 3 in response to the axial pressure and ultrasonic energy applied to the upper or free ends of elements 6 and 7 by tips 12 and 13, respectively, as in the method of FIG. 1. However, it has been found that the guiding extensions 18 and 19 do not adequately guide elements 6 and 7 during the implanting of mounting portions 8 and 9 in body 1 with the result that, at the completion of the method, the portions 10 and 11 projecting from surface 4 of the body may deviate substantially from the desired normal relation to the surface 4. Further, when mounting portions 8 and 9 are fully implanted or embedded in body 1, guiding extensions 18 and 19 may project from the undersurface 5 of body 1 and may interfere with the full utilization of the space under body 1, particularly when the latter is a chassis or deck of a tape recorder or the like.

Referring now to FIGS. 7A–7D, it will be seen that, in the method according to this invention, as there illustrated, the synthetic resin body 65, which is preferably thermoplastic, has holes 67 therethrough opening at the opposite surfaces 65a and 65b of the body, and at least some of which may be formed within bosses 66 extending from the surface 65b. The metal elements 71 which are to be secured to body 65 each include a mounting portion 72 to be implanted or embedded in body 65 and preferably having a roughened or knurled surface 72a, and a projecting portion 73 of smaller cross-sectional area than the respective mounting portion 72 and which is intended to project from the surface 65a of body 65. Each hole 67 is dimensioned so that the projecting portion 73 of the respective element 71 can extend feely therethrough, whereas the diameter of each mounting portion 72 is preferably larger than that of the respective hole 67. Further, as shown, the surface 65b of body 65 is preferably formed with an annular recess 67' around the respective end of each hole 67, with the outer diameter of such recess 67' being substantially larger than the diameter of the respective mounting portion 72.

In practicing the method according to this invention, the portions 73 of metal elements 71 are inserted into the respective holes 67 at the ends of the latter opening through surface 65b, that is, the surface opposed to the surface 65a from which the portions 73 are to eventually project, so that the mounting portions 72 are engageable against the surface 65b within the recesses 67' about the respective holes 67 (FIG. 7A). If the surface 65a from which the portions 73 of elements 71 will eventually project is the top surface of body 65, the latter is conveniently inverted during the securing of the elements 71 thereto, as shown on FIGS. 7A–7C. After portions 73 of elements 71 have been inserted in holes 67, as aforesaid, the mounting portion 72 of each element 71 is pressed in the axial direction of the respective hole 67 toward the surface 65a and simultaneously heat is applied to each mounting portion 72 for conduction through the latter to the region of contact of each mounting portion 72 with body 65, whereby the thermoplastic resin in each region of contact is softened to permit the respective mounting portion 72 to move axially into the hole 67 while the respective portion 73 projects axially from the hole beyond the surface 65a (FIG. 7B). When the portion 73 of each element 71 projects to the desired extent from surface 65a (FIG. 7C), the axially applied pressure and heat are removed from the respective mounting portion 72, so that the previously softened thermoplastic resin hardens about the mounting portion 72 and firmly adheres to its knurled surfaCe 72a for securely embedding each mounting portion 72 within Lody 65 with the respective portion 73 projecting from surface 65a (FIG. 7D).

As shown on FIGS. 7B and 7C, the axial pressing and heating of the mounting portion 72 of each metal element 71, as aforesaid, is preferably effected by the tip 40 of a respective heating unit 41 which is urged downwardly against the mounting portion 72. The end surface of each tip 40 preferably has a diameter smaller than the diameter of the recess 67' in surface 65b so that, when the mounting portion 72 has been fully embedded in body 65, contact of heating tip 40 with body 65 will be avoided.

It will be apparent that, during the movement of each mounting portion 72 into body 65 by the application of heat and axial pressure to mounting portion 72 by the respective heating tip 40, the metal element 71 may be axially guided by the sliding engagement of its projecting portion 73 in the respective hole 67. In order to further axially guide each element 71 and to precisely limit the extent to which its portion 73 finally projects from surface 65a of body 65, the method according to this invention, as described above, is preferably practiced with a guide jig 25 (FIGS. 7A–7C) disposed below body 65, that is, confronting the surface 65a from which portions 73 of elements 71 are to project, and which may include a base 56 having an upstanding guide 60 thereon for each of the elements 71. Each guide 60 is hollow, that is, has an axial bore 61 opening at the upper end 60a of the guide 60 and being diametrically dimensioned to slidably receive and guide the portion 73 of the respective element 71 as such portion 73 is projected downwardly from surface 65a which is supported, around each hole 67, and the end surface 60a of the respective guide 60. Further, the bottom or closed end surface 62 of each bore 61 defines a reference surface engageable by the end of the respective projecting portion 73 (FIG. 7C) for positively limiting the extent to which such portion 73 may finally project beyond surface 65a.

It will be appreciated that, since the heat is applied directly to each mounting portion 72, the heat is rapidly and well conducted therethrough over the relatively short distances to the region of contact of portion 72 with body 65. Further, since the axial pressure for driving each mounting portion 72 into body 65 is applied to the end of the element 71 having that portion 72 thereon, rather than at the end of the element remote from its mounting portion as in the prior methods of FIGS. 1 and 2, the axial stability of each element 71 is enhanced, that is, the axial pressure does not encourage the deviation of the element 71 from normal relation to surface 65a. It will also be appreciated that the heat applied to mounting portion 72 of each element 71 for softening the thermoplastic resin around hole 67 will not deleteriously affect the guide bores 61 of guides 60 so that the jig 25 will have a long useful life when used with the method according to this invention.

Figure 3:
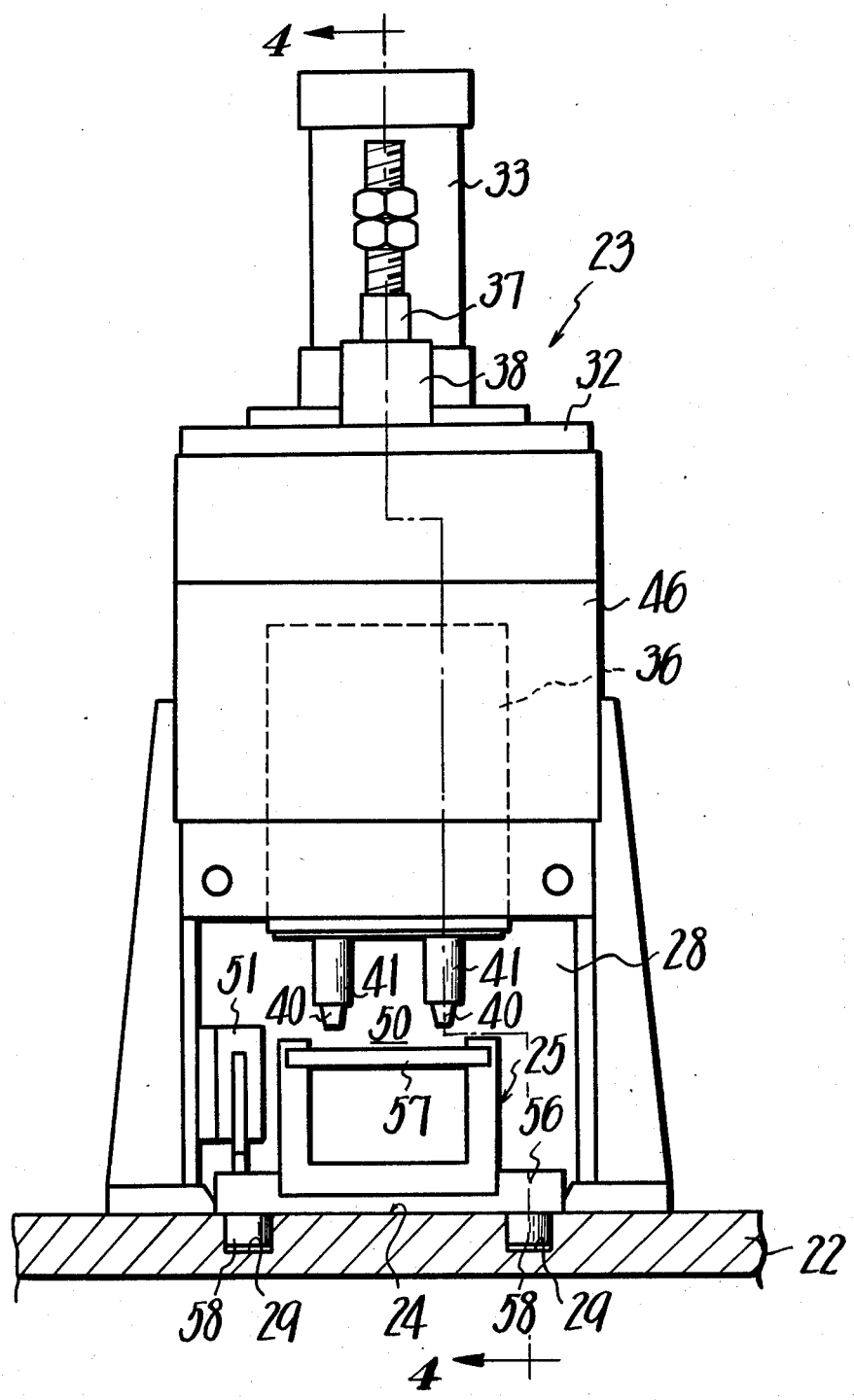
FIG. 3 is a front elevational view of an apparatus according to an embodiment of this invention for embedding or implanting a plurality of metal elements in a synthetic resin body.
Figure 4:
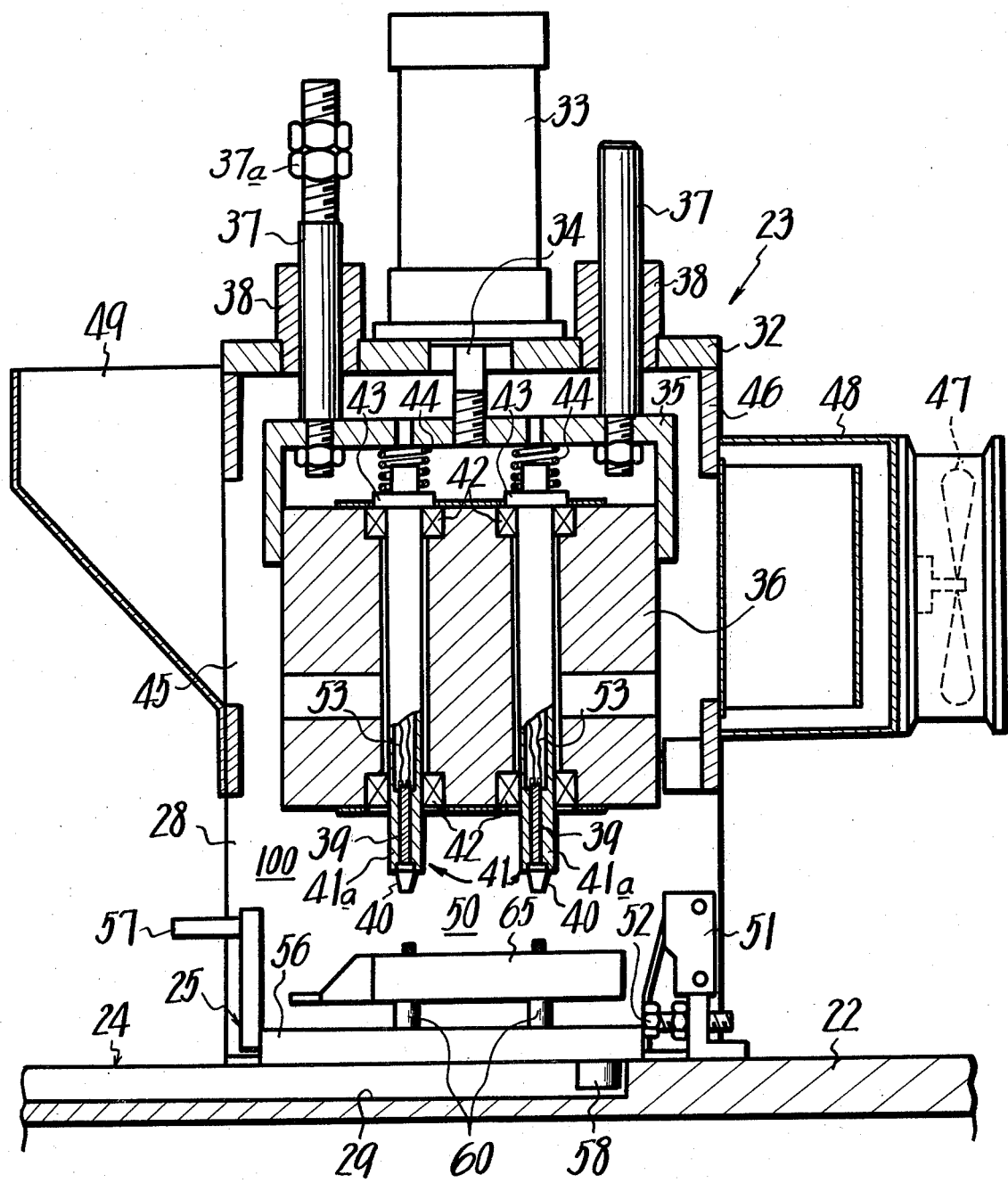
FIG. 4 is a vertical sectional view taken along the line 4—4 on FIG. 3.

Referring now to FIGS. 3 and 4 of the drawings, it will be seen that a preferred apparatus 23 for practicing the above described method according to this invention generally comprises a bed plate or base 22 having an upper surface 24 on which jig 25 is mounted, a frame 32 extending above bed plate 22 and having an opening 28 at the lower portion of the front of frame 32 through which jig 25 can be moved into and out of the interior space 100 of frame 32, as hereinafter described. A fluid pressure operated actuating cylinder 33, for example, operated by air under pressure, is mounted on top of frame 32 and has a downwardly directed piston rod 34 secured, at its lower end, to a yoke 35 which, in turn, is suitably secured to a vertically movable head 36. Guide rods 37 extend upwardly from yoke 32 and are slidably received in guide bushings 38 in the top of frame 32 for guiding the vertical movements of head 36. Stop nuts 37a may be provided on a threaded extension of at least one of the guide rods 37 so as to be engageable with the upper end of the respective guide bushing 38 for adjustably limiting the downward movement of head 36.

The heating units 41 corresponding in number and location to the number and location of the metal elements 71 to be implanted or embedded in the synthetic resin body 65 are mounted in head 36 for movement with the latter and for limited vertical movement with respect to head 36. More specifically, as shown particularly on FIG. 4, each of the heating units 41 includes an elongated tube 41a containing an electrical heating element 39 from which the respective heating tip 40 projects at the lower end of tube 41a. Each tube 41a extends vertically in a respective bore formed in head 36 and is slidably received in heat-resistant bearings 42, for example, of ceramic, provided at the upper and lower ends of the respective bore. A flange 43 is provided at the upper end portion of each tube 41a for limiting the downward movement of each tube 41a relative to head 36, and a helical compression spring 44 is interposed between flange 43 of each tube 41a and yoke 35 for yieldably urging the respective heating unit 41 downwardly relative to head 36 to the position shown on FIG. 4 where its flange 43 engages the top of head 36 and the heating tip 40 depends a predetermined distance from head 36. Electrical leads 53 extend from each heating element 39 through the respective tube 41a and are suitably connected to a control panel (not shown) for supplying electrical current to the heating element 39 and controlling the operation of the latter.

A wall 46 extends around the upper portion of frame 32, and a fan 47 driven by an electric motor (not shown) is disposed within a duct 48 extending from the back of wall 46 for blowing cooling air into the interior space 100 enclosed by frame 32 and wall 46. At the front of apparatus 23, wall 46 has an opening 45 from which an exhaust duct 49 extends for directing upwardly the warmed air that is driven from space 100 by the operation of fan 47.

The base plate 56 of jig 25 is slidable on upper surface 24 of bed plate 22 and has depending guide rollers 58 (FIGS. 3, 4 and 5) which are received in parallel grooves 29 formed in surface 24 for guiding the movement of jig 25 from its operative position 50 (FIGS. 3 and 4) within the interior 100 of frame 23, that is, under head 36, through opening 28 to a loading and unloading position (not shown) in front of frame 23 at which a synthetic resin body 65 can be conveniently placed on and removed from jig 25. A handle 57 extends from the forward end of base plate 56 of jig 25 for use in manually displacing the jig between its operative position and its loading and unloading position. Adjustable stops 52 (FIG. 4) mounted on bed plate 22 are engageable by the back end of the jig base plate 56 for precisely determining the operative position 50 of jig 25, and a microswitch 51 is mounted on frame 32 and is engageable by the back end of jig base plate 56 when the jig is in its operative position 50. Switch 51 is provided to control the operation of actuating cylinder 33 so that, upon actuation of switch 51 in response to the movement of jig 25 to its operative position 50, air or fluid under pressure is supplied to cylinder 33 for moving head 36 downwardly from its raised inoperative position shown on FIGS. 3 and 4 to a lowered operative position (not shown) determined by stop nuts 37a, with head 36 being returned upwardly to its raised inoperative position after a predetermined period in its lowered operative position. Preferably, the heating temperature of each heating element 39 is independently controlled in accordance with the surface area of the mounting portion 72 of the respective metal element 71 to be implanted or embedded in the synthetic resin body 65.

As previously described, the resin body 65 in which the metal elements 71 are to be embedded or implanted is vertically positioned above jig base plate 56 by engagement with the upper end surfaces 60a of the guides 60 which are equal in number to the metal elements 71 and, as shown particularly on FIG. 6, may have varying heights in correspondence with the configuration of the surface 65a which is at the underside of body 65 when the latter is positioned on jig 25. As shown particularly on FIGS. 5 and 6, the jig 25 further has positioning members 59 extending upwardly from base plate 56 and which are engageable with corners and/or side surfaces of body 65 for horizontally positioning the latter in respect to jig base plate 56. Although the guides 60 have been described as having axial bores opening at their upper ends for guiding association with metal elements 71 which, when implanted or embedded in body 65, have projecting portions 73 extending beyond surface 65a, for example, so as to constitute shafts, guide pins or the like, certain of the guides 60 may be made solid for association with metal elements, such as, metal bushings or the like, which are fully contained within synthetic resin body 65 when implanted or embedded in the latter.

The operation of apparatus 23 according to this invention will now be described in connection with the installation of a plurality of metal elements 71 in a synthetic resin body 65 which, as shown on FIG. 5, is in the form of a molded chassis for a tape recorder. With jig 25 initially disposed in its loading and unloading position in front of frame 32, the molded chassis 65 is disposed in inverted condition on jig 25 with the positioning members 59 of the latter ensuring that the several holes 67 in molded chassis 65 will be aligned with guide bores 61 of the respective guides 60 engaging surface 65a of the chassis at the underside of the latter. Then, the several elements 71 have their reduced diameter projecting portions 73 inserted downwardly through the respective holes 67 and into guide bores 61 of guides 60 so that the mounting portions 72 of elements 71 will rest on the upwardly facing surface 65b of the molded chassis (FIG. 7A).

With molded chassis 65 and metal elements 71 positioned on jig 25, as described above, jig 25 is moved rearwardly through opening 28 to its operative position 50 within interior 100 of frame 32. Upon reaching such operative position, further movement of jig 25 is prevented by stops 52 and switch 51 is actuated to initiate an operation of actuating cylinder 33. In such operation of actuating cylinder 33, air under pressure is supplied to cylinder 33 so as to cause downward movement of its piston rod 34, and hence of yoke 35 and head 36. The heating tips 40, which have already been heated by the respective heating elements 39, move downwardly with head 36 into contact with mounting portions 72 at the upper ends of elements 71. Since the configuration of molded chassis 65 may result in the mounting portions 72 of the several metal elements 71 being initially disposed at various levels, as shown on FIG. 7A, the various heating tips 40 may make actual contact with the respective mounting portions 72 at different positions of head 36 during the downward movement of the latter. As each heating tip 40 actually contacts the respective mounting portion 72, heat energy is supplied to such mounting portion 72 and, during further downward movement of head 36, each metal element 71 having its mounting portion 72 engaged by the respective heating tip 40 is urged downwardly by a yieldable force determined by the resistance of the respective spring 44 to displacement of the heating unit 41 upwardly relative to downwardly moving head 36. As head 36 continues its downward movement toward its lowered operative position, the heat applied to each mounting portion 72 contacted by a heating tip 40 is transmitted through mounting portion 72 to its region of contact with chassis 65 for softening the thermoplastic resin in such region so that the downward pressure of heating tip 40 on the mounting portion 72 can move the latter into the respective hole 67 which originally had a smaller diameter. During such movement of a mounting portion 72 into the respective hole 67, the hole 67 and guide bore 61 of the respective guide 60 guide the reduced diameter projecting portion 73 of the metal element 71 so that there is no possibility of the latter becoming inclined or out of place during the operation of apparatus 23.

As each mounting portion 72 is fully embedded or implanted in chassis 65 with the respective projecting portion 73 of the element 71 extending the desired distance beyond surface 65a of the chassis, further downward movement of such element 71 is prevented by the engagement of its lower end with the reference surface 62 at the bottom of the respective guide bore 61. During further downward movement of head 36 each heating unit 41 associated with an element 71 which has engaged its respective reference surface 62 merely moves upwardly relative to head 36 against the force of the respective spring 44. Thus, the mounting of the heating units 41 for limited vertical movement in respect to head 36 permits the apparatus 23 to simultaneously install a plurality of metal elements 71 which, in their final positions as determined by the respective reference surfaces 62, may have their mounting portions 72 at different levels relative to jig base plate 56. Further, even if the heating tips 40 become worn, the reference surfaces 62 in guides 60 in combination with the mounting of the heating units 41 for limited vertical movement in head 36 ensure that all of the metal elements 71 will finally be embedded in molded chassis 65 with their portions 73 projecting the precisely predetermined distances from surface 65a.

As previously mentioned, the application of heat from heating tips 40 to mounting portions 72 of elements 71 ensures that the heat will have to travel only relatively short distances through mounting portions 72 to the regions of contact of the latter with molded chassis 65, whereby the conduction of heat is efficiently effected to ensure that the softening of the surface of each hole 67 is achieved positively and uniformly to permit the rapid and uniform embedding of mounting portions 72 within molded chassis 65.

In the apparatus 23 according to this invention, the heating tips 40 are heated to temperatures in the range between 450° and 550° C. and, with such temperatures of the heating tips 40, it is found that metal elements 71 having projecting portions 73 with a diameter of about 3mm. can have their enlarged mounting portions 72 embedded or implanted in the molded chassis 65 in about 2 to 4 seconds. As previously mentioned, the temperature to which each of the heating tips 40 is heated by the respective heating element 39 is suitably controlled in accordance with the surface area of the respective mounting portion 72 to be embedded in the molded chassis 65, and preferably also in accordance with the initial level of the mounting portion 72, which, of course, affects the period of time during which each heating tip 40 contacts the respective mounting portion 72 during downward movement of head 36. The foregoing advantages of the apparatus 23 according to this invention are to be contrasted with the problems encountered in known apparatus employing ultrasonic energy for a similar purpose, for example, as illustrated on FIGS. 1 and 2. When ultrasonic energy is employed for driving the mounting portions 8 and 9 of metal elements 6 and 7 into a resin body 1 which is shaped so that the projecting portions 10 and 11 of elements 6 and 7 are at different levels, as on FIGS. 1 and 2, the tips 12 and 13 extending from the ultrasonic horn 14 are required to have different lengths, as shown. By reason of their different lengths, tips 12 and 13 have different resonant frequencies and thus do not uniformly transmit the ultrasonic energy to the respective metal elements 6 and 7. When the ultrasonic energy is nonuniformly transmitted to the several metal elements, there is the danger that certain of those elements will not be securely fixed in the resin body. This problem does not exist in the apparatus 23, as the transmission of heat to each element 71 can be adapted to provide the secure embedding of each mounting portion 72 in the chassis or body 65.

After head 36 has been moved to its lowered operative position for securing all of metal elements 71 in molded chassis or body 65, the supplying of air under pressure to actuating cylinder 33 is reversed so that its piston rod 34 is moved upwardly or retracted and head 36 is returned to its raised inoperative position with heating tips 40 spaced upwardly from the chassis or body 65 on jig 25. Finally, jig 25 is moved out of the interior 100 of frame 32 to its loading and unloading position at which chassis 65 is removed from jig 25 and inverted to its normal position of use, as shown on FIG. 7D, in which portions 73 of element 71 project upwardly from chassis 65.

It will be apparent that the metal elements 71 thus simultaneously installed in the synthetic resin or body 65 may be rods, solid or hollow shafts, pins, tubes or the like which may be monolithic, or provided with a separately formed exterior bushing, and further that the metal elements 71 may have circular, polygonal or other cross-sectional shapes.

In the apparatus 23 described above, the heating tips 40 function both to apply heat to the mounting portions 72 of elements 71 and also to axially press the latter in the direction for embedding the mounting portions 72 in body or chassis 65. However, it will be apparent that the heat and pressure applying functions may be performed by separate members.

Although an illustrative embodiment of a method and apparatus according to this invention have been described in detail herein with reference to the accompanying drawings, it is to be understood that the invention is not limited to that precise embodiment, and that various changes and modifications may be effected therein by one skilled in the art without departing from the scope or spirit of this invention, as defined in the appended claims.

What is claimed is:

1. The method for providing a body of synthetic resin having first and second opposed surfaces with at least one metal element which is to be secured to said body in projecting relation to said first surface, each said metal element comprising a mounting portion at an end thereof and another portion, said body having a hole for each said metal element, each said hole passing through said body to have its opposite ends opening at said first and second surfaces, respectively, said other portion being longer than said hole and having a cylindrical section that extends beyond said first surface before said mounting portion enters said hole, said method comprising the steps of inserting each said metal element into its respective hole at the end of the latter opening at said second surface, pressing each said metal element in the axial direction of said hole toward said first surface of the body so as to urge said mounting portion into said hole, separately guiding said cylindrical section from beyond said first surface and simultaneously applying heat to said element while said element is being pressed and guided in the axial direction, said heat flowing from said element into said body to soften said body at the region of contact of said mounting portion therewith until said mounting portion is contained in said hole in a predetermined, guided position, and hardening said body at said region of its contact with the mounting portion of said metal element.

2. The method as in claim 1 in which said synthetic resin is thermoplastic, the softening of said region of the body is effected by applying heat to said element in the region of its mounting portion, and said hardening of the body at said region is effected by halting the application of heat thereto.

3. The method as in claim 2 in which the heat is applied to said mounting portion by engaging a heat source therewith, and said heat source is urged in said axial direction for pressing said mounting portion of the metal element into said body.

4. The method as in claim 3 in which said second surface is recessed around the respective end of said hole to avoid contact of said heat source with the body when said mounting portion is moved into said hole.

5. The method as in claim 1 in which said mounting portion has a rough surface.

6. The method as in claim 1 comprising the additional steps of limiting the extent to which said metal element can project from said first surface of the body.

7. The method as in claim 1 in which a plurality of the metal elements are simultaneously secured to the body, as aforesaid.

8. The method as in claim 1 wherein said step of applying heat to said element comprises applying heat in the range of 450° to 550° C.

9. The method of providing a body of thermoplastic resin having first and second opposed surfaces with at least one metal element which is to be secured to said body in projecting relation to said first surface, said body having a hole for each said metal element extending through the body between said surfaces and dimensioned to permit one end of the respective metal element to be freely inserted in the hole from said second surface sufficiently to extend beyond said first surface, each said metal element having at the other end, an enlarged mounting portion which has a cross-sectional area larger than that of said hole, the portion of said element that extends beyond said first surface having a cylindrical section, said method comprising the steps of inserting said one end and said cylindrical portion of each said metal element into a respective one said hole from said second surface so that said mounting portion of the respective element is engageable against said second surface about said hole; pressing said mounting portion of each said metal element into its respective hole, guiding the cylindrical portion of each metal element from beyond said first surface of the body; simultaneously applying heat to said mounting portion while each said respective metal element is pressed and guided into its respective hole in said body for conduction of heat through said mounting portion to the region of contact of said mounting portion with said body, whereby the thermoplastic resin in said region is softened to permit the movement of said mounting portion into said hole and the projection of said metal element from said first surface; and halting said pressing of the mounting portion and said applying of heat thereto when said metal element projects to the desired extent from said first surface whereby the previously softened thermoplastic resin hardens about said mounting portion for securing the latter in said body in a predetermined, guided position.

* * * * *